March 19, 1929. S. BARFOED 1,706,020
BUTTERFLY VALVE
Filed June 17, 1927
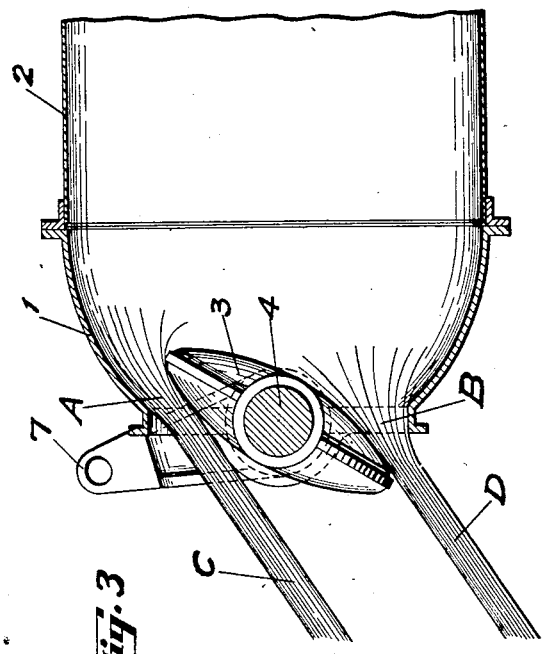
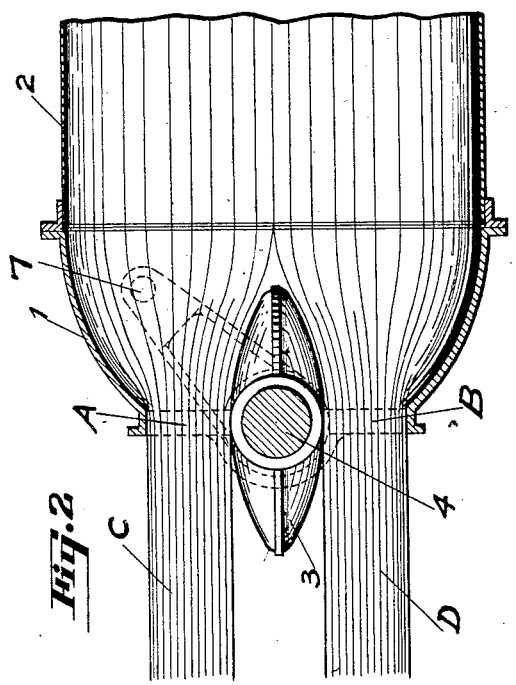
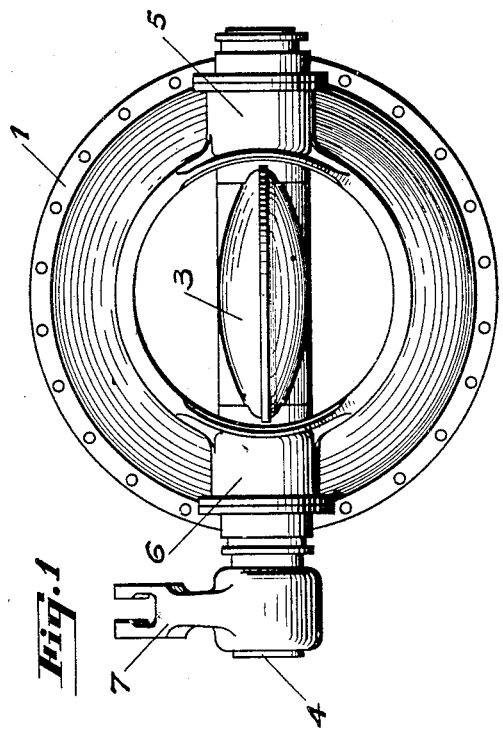
INVENTOR.
Svend Barfoed Patented Mar. 19, 1929.

1,706,020

UNITED STATES PATENT OFFICE.

SVEND BARFOED, OF SAN FRANCISCO, CALIFORNIA.

BUTTERFLY VALVE.

Application filed June 17, 1927. Serial No. 199,617.

My invention relates to improvements in free discharge water valves and the objects of my improvement are to provide a water valve of the butterfly type intended for use in discharging water from pipes where it is held under pressure, as from reservoir dams, pipe lines, or water conduits, and to provide a safe design for such a valve.

Water from pressure systems must be discharged in solid jets with as little disturbance as possible. To form solid jets nozzles must be provided to guide the water smoothly and without shock from the discharge orifices. Furthermore, as the water leaves the valve there must be no obstruction to interfere with the natural direction of the jets as given by the nozzles. The nozzles must be constructed with converging walls, since parallel and diverging walls create pressure fluctuations which set up vibrations and shocks which in a short time destroy the valves and their settings.

I accomplish these objects by the means illustrated in the accompanying drawings in which—

Figure 1 is a view of the valve fully open, looking in an up-stream direction, Fig. 2 is a longitudinal section of the nozzle with the valve fully open, Fig. 3 is a longitudinal section of the nozzle with the valve partly open.

The valve housing 1 is shown connected to the end of a pipe line 2. The butterfly disk 3 is keyed upon shaft 4 rotating in trunnions 5 and 6, and the shaft 4 is rotated by means of lever 7 also keyed to shaft 4. The lever 7 may be operated in any usual way.

The manner in which the nozzles at A and B are contracted by the opening of the butterfly valve is of great importance, and the means by which this is accomplished forms the subject matter of the present application. In particular, nozzle A is the one concerned, since nozzle B will properly contract for any degree of opening of almost any symmetrically constructed valve.

The requirement in nozzle A is its walls shall converge into a nozzle. The inner surface of housing 1 and the down-stream surface of butterfly disk 3 must converge at all times and for any degree of opening of the valve. These surfaces are preferably smoothly curved and may be of any degree of curvature so long as they are designed to form with each other, for any degree of opening of the valve, a narrowing nozzle.

By this construction, jet C is discharged from an orifice to which there is no obstruction for any degree of opening of the valve, and regardless of the angle at which the jet leaves the end of the pipe. This insures a smooth unobstructed discharge free from vibration or knocking.

Jet D may be given a parallel direction by symmetrical curvature of the up-stream surface of butterfly disk 3.

I claim:

1. The combination with a hydraulic pipe line of a housing secured at the end of the pipe line, said housing having a circular discharge opening formed therein at the end opposite the pipe line, said discharge opening having a diameter smaller than the pipe line, an annular converging surface formed within the housing between the pipe line and the discharge opening, and a circular shaped butterfly valve centrally pivoted in the discharge opening.

2. The combination with a hydraulic pipe line of a housing secured at the end of the pipe line, said housing having a circular discharge opening formed therein at the end opposite the pipe line, said discharge opening having a diameter smaller than the pipe line, an annular converging surface formed within the housing between the pipe line and the discharge opening, and a circular shaped butterfly valve centrally pivoted in the discharge opening, said butterfly valve presenting opposite convex surfaces.

In testimony whereof, I hereby affix my signature.

SVEND BARFOED.